United States Patent [19]

Klein et al.

[11] 4,448,928

[45] May 15, 1984

[54] SHELF-STABLE CATALYST COMPONENT FOR RTV SILICONE COMPOSITION

[75] Inventors: Steven H. Klein, Clifton Park; Alfred H. Smith, Jr., Ballston Lake, both of N.Y.

[73] Assignee: General Electric Company, Waterford, N.Y.

[21] Appl. No.: 476,174

[22] Filed: Mar. 17, 1983

Related U.S. Application Data

[62] Division of Ser. No. 238,333, Feb. 26, 1981, Pat. No. 4,388,433.

[51] Int. Cl.$^3$ .............................................. C08L 83/06
[52] U.S. Cl. .................................. 524/864; 524/865; 524/866; 524/863; 525/477; 528/18; 528/22; 528/34
[58] Field of Search ............................ 252/428, 188.3; 524/401, 425, 906, 865, 864, 866; 106/309; 523/351; 528/18, 22, 34; 525/477

[56] References Cited

U.S. PATENT DOCUMENTS 3,839,246 10/1974 Hamilton et al. .................... 528/22
3,888,815 6/1975 Bessmer et al. ..................... 524/783
4,175,977 11/1979 Heaton et al. ...................... 524/607

*Primary Examiner*—Wilbert J. Briggs, Sr.

[57] ABSTRACT

A process for producing a shelf-stable catalyst component for a room temperature vulcanizable silicone rubber composition comprising (a) mixing a organopolysiloxane fluid with first from 1 to 15 percent by weight of the total amounts of the following ingredients (1) an alkyl silicate cross-linking agent (2) a catalytic promoter which is a tin salt and (3) a self-bonding additive which is nitrogen-functional self-bonding additive until there is a uniform mixture; (b) adding to the mixture from 10 to 250 parts of filler and mixing the ingredients to a uniform mixture wherein the mixture is heated at a temperature of at least 100° C. for at least 1 hour so as to drive off moisture and form a stable base mixture and then adding to the stable base mixture the rest of the cross-linking agent, the catalytic promoter and the shelf-bonding additive to form a self-stable uniform mixture.

3 Claims, No Drawings

SHELF-STABLE CATALYST COMPONENT FOR RTV SILICONE COMPOSITION

This application is a division of application Ser. No. 238,333, filed Feb. 26, 1981 now U.S. Pat. No. 4,388,433.

BACKGROUND OF THE INVENTION

The present invention relates to two component room temperature vulcanizable silicone rubber compositions and more particularly the present invention relates to two component room temperature vulcanizable silicone rubber compositions which are shelf-stable.

Two component room temperature vulcanizable silicone rubber compositions are well known (RTV shall hereinafter be utilized to refer to room temperature vulcanizable). Generally such compositions comprise as a basic ingredient a silanol terminated diorganopolysiloxane polymer and a filler which is usually formed into one package and in a second package there is mixed an alkyl silicate or partial hydrolysis product of an alkyl silicate as a cross-linking agent, a metal salt as a curing promoter and other ingredients such as additives, fillers and plasticizers. An example of a two-component RTV compositions with nitrogen-functional self-bonding additives can be found in Bessmer et al. U.S. Pat. No. 3,888,815 which is hereby incorporated by reference.

Usually such compositions are packaged such that per 100 parts of the first or base component there is added 10 parts of the second or catalyst component. Further, some of the filler is sometimes incorporated in the second or catalyst component so as to increase the viscosity of the component so that it can be properly metered and pumped to a uniform composition. Such composition is mixed with the base component to form a uniformly mixed two component RTV composition to be applied as a roof coating or as an insulating glass sealant in further applications.

Normally there is utilized per 100 parts of the base composition from 1 to 15 parts and preferably 10 parts of the catalyst composition that is a 10 to 1 mixing ratio.

A plasticizing fluid was also utilized in the second catalyst component as a diluent. However, it was found that there were problems associated with such composition and in particular with a catalyst component of such composition. Thus it was found that mixing and preparing a catalyst component in which there are present a plasticizing fluid, an alkyl silicate cross-linking agent, a tin catalyst and a nitrogen-functional self-bonding additive that the composition would have certain defects. One of the defects that it would have was that soon after it was prepared it would decrease in viscosity rapidly to the viscosity of water so it could not be pumped properly into the rest of the composition. There was also the problem of oil separation, in that the polysiloxane fluid would separate out from the rest of the composition and it would be necessary to mix the oil back into the rest of the composition before the composition could be utilized. Further, there was formed in the composition hard rock like nodules which made the composition unusable in that it might be unsightly and also in that the nodules might clog up the nozzles of the pump being utilized to pump such composition.

Further, in some cases it was found that the nodules would increase to a size such that the composition would be unusable altogether. It was found that this occurred in compositions as soon as one month after they had been prepared even when the preparation of the catalyst component was carried out under a nitrogen atmosphere and the composition was packaged in the substantial absence of moisture and air.

One way of solving this difficulty was to remove all contaminants from the mixing vessel of each batch of catalyst component prepared. By removing the ingredients of the prior batch, it is meant that the vessel was completely emptied and scraped down of all composition before it was utilized to prepare a new batch of catalyst component. This was necessary even though the kettle was utilized to produce a batch of the same composition in the prior use of the kettle. The emptying and scraping down of the kettle in which the batch of catalyst composition was prepared would usually take about 24 hours and increased the cost of preparing the catalyst component by a factor of two to three. However, it was found that even with these clean out procedures the above defects would still appear.

Accordingly it was highly desirable to find a process by which such catalyst components could be prepared such that they would have a shelf stability of six months or more without the formation of nodules, without oil separation or with a minimum of oil separation and without any decrease of viscosity. In the mixing procedure utilized to mix the catalyst component prior to that of the present invention, the filler was wetted into the plasticizing polymer. The mixture was then dried at temperatures above 100° C. under vacuum for at least two hours so as to remove all moisture from the filler and the plasticizing fluid. The mixture was then cooled and a pre-blend of a cross-linking agent, self-bonding additive and metal salt was added slowly while mixing. Thereafter the mixture was mixed for 30 minutes, an additional 20 minutes under vacuum to remove all air and then packaged under a nitrogen atmosphere in the substantial absence of moisture. As stated previously, the utilization of this procedure and the complete shut down and scraping of the mixing kettle so as to remove all parts of the prior mixed composition did not result in an altogether satisfactory composition as far as shelf-stability was concerned.

Further the requirement of a 24 hour shut down for scraping down of the mixing kettle resulted in an undesirable increased cost of the catalyst component. Accordingly, it was found highly desirable to develop a process or a means for producing a shelf-stable inexpensive catalyst component for an RTV composition.

It is one object of the present invention to provide for a shelf-stable RTV catalyst component for two-component RTV composition.

It is an additional object of the present invention to provide a inexpensive and efficient process for producing a shelf-stable catalyst component for a two-component RTV composition.

It is an additional object of the present invention to provide a process for producing a catalyst component for a two-component RTV composition in which the catalyst component is shelf stable and does not produce nodules upon standing, does not separate oil and does not decrease measurably in viscosity. These and other objects of the present invention are accomplished by means of the disclosure set forth hereinbelow.

SUMMARY OF THE INVENTION

In accordance with the above objects there is provided by the present invention, a process for producing a shelf-stable catalyst component for a room temperature vulcanizable silicone rubber composition comprising (a) mixing 100 parts by weight of an organopolysiloxane fluid of a viscosity varying from 1,000 to 50,000 centipoise where the organo group is a monovalent hydrocarbon group with 1 to 15 percent by weight of the total amount used of the following ingredients: (1) an alkyl silicate cross-linking agent of the formula,

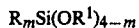
$$R_mSi(OR^1)_{4-m} \tag{1}$$

or partial hydrolysis products thereof where R and $R^1$ are monovalent hydrocarbon radicals, m is 0 or 1 (2) a catalytic promoter which is a tin salt and (3) a self-bonding additive of the formula,

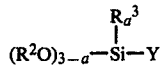
$$(R^2O)_{3-a}-\underset{\underset{R_a^3}{|}}{Si}-Y \tag{2}$$

where $R^2$ and $R^3$ are alkyl radicals of 1 to 8 carbon atoms, a is 0 or 1 and Y is a nitrogen-functional radical which is a saturated, unsaturated or aromatic residue which in addition to nitrogen functionality may be functionalized by a radical selected from the class consisting of amino, cyano, thio, oxo, and ester, and multiplies and combinations thereof; (b) adding to the mixture from 10 to 250 parts of a filler and mixing the ingredients to a uniform mixture where the mixture is heated to a temperature of at least 100° C. for at least 1 hour to form a base mixture; and (c) mixing into the base mixture the rest of the cross-linking agent, the catalytic promoter and self-bonding additive and mixing them to a uniform mixture by agitating the base mixture and the rest of the ingredients for at least 30 minutes wherein the entire process is carried out in the substantial absence of moisture.

The most preferred tin salt is dibutyl tin oxide and the most preferred self-bonding additive is gamma-aminopropyltriethoxysilane. Preferably into the mixture there is added from 1 to 15 percent by weight and more preferably 1 to 10 percent of these ingredients which are mixed and wetted into the filler along with the plasticizing fluid, while the mixture is heated to dry off moisture from the filler and the rest of the ingredients, and then after the heating has been carried out to add the rest of the total of the cross-linking agent, catalytic promoter and self-bonding additive to form a uniform mixture. It has been found by this procedure that the shelf-stability of the composition has been extended for a period of six months or more after manufacture.

The plasticizing fluid is preferably a fluid that does not contain any silanol groups. Most preferably it is a vinyl terminated dimethylpolysiloxane polymer of a viscosity varing from 10,000 to 50,000 centipoise since such a polymer usually does not have the silanol in it. Further the higher viscosity yields substantially a more stabilizing effect to the final mixed composition, such that the mixed composition has a viscosity in the range of 30,000 to 250,000 centipoise at 25° C. which is the desired viscosity range of the catalyst component for its use along with a base component in a mixing apparatus. A more full description of the invention is referred to in the description hereinbelow.

DESCRIPTION OF THE PREFERRED EMBODIMENT

Another patent that is relevant to the invention of the instant case is Lampe et al. U.S. Pat. No. 3,839,246 which discloses a reaction product of a phthalate with a tin salt of a carboxylic acid which is utilized as a catalyst in a two-component RTV composition. The reaction product is a solubilized catalyst which dispenses easily into into the base component of the two-component RTV composition. This results in a reaction time and more uniform reaction and curing time. Although such a catalyst system can be utilized in the compositions of the present invention, it is not necessary. At any rate, the disclosure of the above U.S. Pat. No. 3,839,246 is incorporated in the present case by reference. Proceeding now to the catalyst component of the instant invention, the base component is the plasticizer whose concentration is 100 parts by weight of an organopolysiloxane fluid of a viscosity varying from 1,000 to 50,000 centipoise which the organo group is a monovalent hydrocarbon radical. Preferably, the organopolysiloxane is a linear diorganopolysiloxane where the organo group is a monovalent hydrocarbon radical such as alkyl, alkenyl, cycloalkyl, mononuclear aryl, fluoroalkyl, etc. Preferably, the organopolysiloxane plasticizer has a viscosity varying from 10,000 to 50,000 centipoise at 25° C. It can be a dialkyl polysiloxane linear polymer. The only difficulty with a dialkyl polymer such as a polydimethylsiloxane polymer as a plasticizer in the instant invention is that it tends to have silanol groups in it as the result of the process by which it is made. If such plasticizer or organopolysiloxane fluid has silanol groups in it, then when it is contacted with the alkyl silicate cross-linking agent, it will hydrolyze the alkyl silicate cross-linking agent and seriously lower the viscosity of the composition as well as decrease the cross linking activity of the alkyl silicate cross linking agent. Accordingly, it is preferred that the organopolysiloxane fluid not be a completely dialkylpolysiloxane or more specifically linear dimethylpolysiloxane. Preferably, the organopolysiloxane fluid is a vinyl terminated diorganopolysiloxane polymer of a viscosity varying from 1,000 to 50,000 centipoise at 25° C. and more preferably, has a viscosity varying from 10,000 to 50,000 at 25° C. Preferably the vinyl terminated diorganopolysiloxane polymer has the formula,

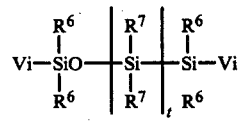

(3)

where Vi is vinyl $R^6$ is selected from a class consisting of alkyl radicals from 1 to 8 carbon atoms and fluoroalkyl radicals $R^7$ is selected from the class consisting of vinyl, alkyl radicals and fluoroalkyl of 1 to 8 caron atoms and t varies such that the viscosity of the polymer varies from 10,000 to 50,000 centipoise at 25° C. This is the preferred vinyl terminated diorganopolysiloxane fluid. However it should be noted that the organo groups of the vinyl terminated diorganopolysiloxane may be the same as that shown and defined for the polymers of Formula (3). For instance the organo groups can be selected from alkyl radicals such as methyl, ethyl etc. cycloalkyl radicals such as cyclohexyl, cyclopropyl, etc. Alkenyl radicals such as vinyl, alkyl etc; mononuclear aryl radicals such as phenyl, methylphenyl, etc.; and fluoroalkyl radicals such as 3,3,3 trifluoropropyl. Such vinyl terminated diorganopolysiloxane polymers and specifically the vinyl terminated dimethylpolysiloxane polymers are preferred as plasticizing fluids in the present case since they do not contain any silanol groups in them. This is a result of the process by which they are made. However, it should be noted that such vinyl terminated diorganopolysiloxane polymers are more expensive than the dialkylpolysiloxane polymers which are trialkyl siloxy end-stopped or dialkyl silanol end-stopped.

Generally, such vinyl terminated diorganopolysiloxane polymers are produced by equilibriating cyclotetrasiloxanes in the presence of vinyl chain stoppers such as divinyl tetralkylpolysiloxanes, such equilibration being carried out in the presence of small amounts of alkali metal hydroxide catalyst and particularly potassium hydroxide at temperatures above 150° C. After the highest level of equilibration has been reached the alkali metal hydroxide catalyst is neutralized and the extra cyclics stripped off to yield the desired diorganopolysiloxane fluid. Such an organpolysiloxane fluid does contain silanol groups, however, it is more expensive to make than the organopolysiloxane fluid in which the organo group is solely comprised of alkyl groups and more specifically methyl groups. It should be noted that the organopolysiloxane fluid is utilized as a wetting fluid. Since the quantities of alkyl silicate are not as great as the metal salt of carboxylic acid and self-bonding additive, it is necessary to have large quantities of a plasticizing fluid to properly wet out the filler that is added to the second catalyst component. Accordingly, the organopolysiloxane fluid is utilized as a wetting agent in the catalyst component composition which we are concerned with as well as a stablizing additive and also to facilitate the mixing of all the ingredients into a uniform mixture in the shortest period of time.

Another ingredient that is utilized in the composition it generally from 18 to 27 parts by weight thereof is the alkyl silicate cross-linking agent of Formula (1).

Although R and $R^1$ can be alkyl radicals, flouoralkyl radicals, mononuclear radicals, cycloalkyl radicals the radicals R and $R^1$ are most preferably selected from alkyl radicals such as methyl, ethyl, most preferably ethyl, where m is 0 or 1 and is most preferably 0. The most preferred cross-linking agent within the scope of Formula (1) is partial hydrolyzed ethylorthosilicate. The production of such silicates such as of Formula (1) or the partial hydrolysis product is well known in the art.

In the catalyst composition of the present case per 100 parts of the linear diorganopolysiloxane plasticizer, there is utilized from anywhere from 1 to 6 and more preferably from 1 to 5 parts of a tin salt. It should be noted that the preferred range of the alkyl silicate cross-linking agent is from 20 to 25 parts.

If the tin salt is a salt a carboxylic acid, the carboxylic acid may have anywhere from 2 to 20 carbon atoms and may be any tin salt of carboxylic acid such as for instance: dimethyl tin oxide, diethyl tin oxide, dipropyl tin oxide, and dibutyl tin oxide.

Of the above, the most preferred catalyst in the present invention for use in the preparation of an insulating glass sealant application is dibutyl tin oxide. Finally, there is preferably utilized from 35 to 55 parts by weight of the self-bonding additive of Formula (2) per 100 parts by weight of a linear diorganopolysiloxane plasticizer fluid. More preferably, there is utilized from 40 to 50 parts of the self-bonding additive of Formula (2). There is utilized sufficient self-bonding additive to cause the composition to be self-bonding without the self-bonding additive interferring with the catalytic activity of the cross linker. The range of the cross linker as defined above, is the most preferred range for an insulating glass application. There is nothing critical about the above concentration ranges given for the alkyl silicate, cross-linking agent, and metal salt of carboxylic acid, or the self-bonding additive. The ranges of concentration that were given above are the preferred ranges for producing an insulating glass sealant. Generally speaking, per 100 parts of the base silanol polymer in a two-component RTV composition, there is utilized anywhere from 1 to 15 parts by weight of the alkyl silicate cross-linking agent of Formula (1) above, from 1.0 to 10 parts by weight of the self-bonding additive and from 0.01 to 10 parts by weight of the metal salt. There may be utilized in such composition again referring to the base silanol polymer in the two-component RTV composition anywhere from 0.1 to 10 parts by weight of the plasticizing fluid. However the more preferred ranges have been given above initially since these are ranges for an insulative glass application. The self-bonding additive that is utilized is preferably one of Formula 2 above as previously defined. More preferably the self-bonding additive has the formula,

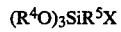

$$(R^4O)_3SiR^5X$$

where $R^4$ is an alkyl radical of 1 to 8 carbon atoms and $R^5$ is a divalent hydrocarbon radical of 2 to 8 carbon atoms and X is a nitrogen functional radical such as amine and so forth. The most preferred self-bonding additive is gamma-aminopropyltriethoxysilane. Other self-bonding additives that is nitrogen functional self-bonding additives that can be utilized in the instant invention and which come within the scope of the above formulas and specifically Formula (2) and (4) are as follows: aminopropyl tri methoxy silane, aminopropyl tri propoxy silane, amino ethyl amino propyl triethoxysilane, amino ethyl amino propyl trimethoxy silane, and amino propyl amino propyl trimethoxy silane.

No attempt will be made to list all the possible nitrogen functional silanes that can be utilized in the instant invention since they are too numerous to mention. Any nitrogen functional silane within the scope of the above formulas can be utilized. The preparation of such nitrogen functional silanes is well known in the art as disclosed in Lampe et al. U.S. Pat. No. 3,888,815 which is hereby incorporated by reference.

Accordingly, the process for preparing such nitrogen functional silanes will not be described herein.

Finally in the second component, there is utilized a filler and preferably, and generally, anywhere from 10 to 250 parts of filler. Filler is utilized in the second RTV component or catalyst component for two purposes: first of all, and most importantly, it will increase the viscosity of the compositions to the desired level so that the total composition is thixotropic that is when the catalyst component is mixed with a base component the total composition is thixotropic and also as a pigment; and finally as a cheap filler and a strengthening agent. Although fillers such as reinforcing fillers may be utilized, extending fillers are preferred. Such reinforcing fillers such as fumed silica and precipitated silica can be utilized since they tend to increase the viscosity of the composition to a higher level. If desired, they can be utilized at a concentration of anywhere from 0 to 50 parts by weight. More preferably there is utilized from 0 to 250 parts by weight of an extending filler and more preferably from 10 to 180 parts by weight of an extending filler which may be any of the extending fillers normally associated with two-component RTV compositions.

Examples of extending fillers which may be utilized, are for instance, titanium dioxide, lithopone, zinc oxide, zirconium silicate silica acrogel, iron oxide, diatomaceous earth, calcium carbonate, glass fibers, magnesium oxide, chromium oxide, zirconium oxide, aluminum oxide, crushed quartz, calcined clay, carbon black, graphite, cork, cotton and synthetic fibers. The most preferred fillers for the instant invention are carbon black and calcium carbonate, because of their cheapness and also for imparting the right color to the composition. These are the basic ingredients in a composition of the instant case however, other ingredients may be utilized as needed. Preferably, there is utilized anywhere from 10 to 60 parts by weight of carbon black and from 1 to 120 parts by way of calcium carbonate to 100 parts of the linear organopolysiloxane plasticizer fluid. However, again there is nothing critical about the concentration of the filler; sufficient amount is added to the composition to impart the proper color characteristics, the proper thixotropic properties and viscosity to the catalyst composition and the proper strength properties of the composition.

Preferably, the total end viscosity of the catalyst composition is anywhere from 30,000 to 250,000 centipoise at 25° C. and more preferably, it has a viscosity of anywhere from 70,000 to 200,000 centipoise at 25° C.

The base composition, Component A plus the catalyst component has a viscosity of anywhere from 100,000 to 1,000,000 centipoise and more preferably has a viscosity anywhere from 100,000 to 700,000 centipoise at 25° C. However, more will be said about the base composition hereinafter.

The process of the instant invention comprises taking 100 parts by weight or the appropriate concentration by weight of the organopolysiloxane fluid and adding to it anywhere from 1 to 15 percent by weight of the total amounts of the ingredients that is the alkyl silicate, a self-bonding additive, and the tin salt. More preferably 1 to 10 percent by weight of the total of these ingredients is added to the linear organopolysiloxane plasticizer fluid initially. The cross-linking agent, the self-bonding additive and tin salt can be pre-blended or mixed together that is the 1 to 15 percent by weight can be pre-blended and then the pre-blend added to the organopolysiloxane plasticizer fluid. Preferably, 1 to 15 percent by weight and more preferably of 1 to 10 percent by weight of these three ingredients are pre-blended together and then the pre-blend is added to the total amount of the organopolysiloxane fluid. After there is formed a uniform mixture, there is added to this uniform mixture of all of these fluids, the total amount of filler.

The resulting composition is heated to a temperature of at least 100° C. for at least 1 hour. More preferably, the composition is heated to a temperature of 100° to 150° C. from 1 to 10 hours and more preferably heated at a temperature of 115° to 130° C. from 1 to 4 hours. It should be noted that the heating may be extended for 6, 10, or 12 hours, however, it is desired to keep the heating time of the composition to a low level so as to keep the cost of preparing the catalyst component to a low level as possible. The reason for heating the composition while the filler is being mixed is to drive off all moisture that is present in the filler and in the other ingredients. Preferably the mixing is carried out in a vacuum such as a vacuum of anywhere from 5 to 500 millimeters of vacuum and preferably the mixing is carried out under a nitrogen atmosphere.

In the initial mixing step it is desired to wet the filler with all of the organopolysiloxane fluid and the other three ingredients that is the self-bonding additive, the cross-linking agent and the tin salt to form a uniform mixture while driving all moisture out of the composition and keeping the composition from coming into contact with moisture. After the heating period is complete, preferably the composition is cooled to a temperature of 50° C. or below and the rest of the three ingredients is mixed into the composition that is the self-bonding additive and the rest of the cross-linking agent and the rest of the tin salt.

It should be noted that when the rest of the ingredients are added to the catalyst component composition, that is the self-bonding additive, the tin salt and the cross-linking agent that this is done slowly over a period of time of at least 30 minutes and preferably, under vacuum, to prevent moisture from getting into the system and also to preferably drive all moisture and air out of the system.

It should be noted that it is not necessary to cool the composition to room temperature or temperatures of 50° C. or below, that the mixing of the rest of the total amount of the three ingredients may be done at elevated temperatures, that is at temperatures at which the composition is heated to previously that is 100° to 150° C. However, the composition can be allowed to cool to 50° C. or below such as room temperature before the rest of the total amount of the three ingredients are added. The addition is anywhere from 30 minutes and more preferably, it should be anywhere from 30 to 90 minutes. If more mixing time is utilized this does not distract from the end product but does result in an increase in the cost of the process. It is also desirable to have a nitrogen purge during the entire process as stated previously and the entire process be carried out under vacuum. The nitrogen purge is to keep atmospheric moisture away from the ingredients and the placing of a vacuum during the entire mixing process is desirable so as to remove any trace amount of moisture and air that are present in the ingredients that are added to the composition, especially in the case of the addition of the filler.

After the mixing of the rest of the ingredients, the composition is dumped into 55 gallon drums under a nitrogen purge and sealed from atmospheric moisture. The composition can then be packaged later into whatever containers that may be desired in the substantial absence of atmospheric moisture.

Prepared as such, the composition has a shelf life of six months and sometimes as much as nine months or more. Such a catalyst component composition does not form nodules or plugs in the composition upon standing and its viscosity remains at anywhere from 30,000 to 250,000 centipoise at 25° C. as stated previously. Such a composition will also have no oil separation for six months or more and also is more stable upon exposure to atmospheric moisture than the previous compositions.

Such composition is also mixed with a base component or Component A so as to cure to a silicone elastomer. The base component comprises 100 parts by weight of a silanol end-stopped diorganopolysiloxane polymer having a viscosity anywhere from 1,000 to 1,000,000 centipoise at 25° C. and more preferably has a viscosity anywhere from 100,000 to 500,000 centipoise at 25° C. where the organo groups in the silanol end-stopped diorganopolysiloxane polymer are monovalent hydrocarbon radicals. The monovalent hydrocarbon radicals can be any of the monovalent hydrocarbon radicals identified previously. Preferably, such a polymer has the formula,

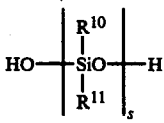

where $R^{10}$ and $R^{11}$ are independently selected from monovalent hydrocarbon radicals and s varies such that the viscosity of the polymer varies from 1,000 to 1,000,000 centipoise at 25° C. The monovalent hydrocarbon radicals $R^{10}$ and $R^{11}$ can be any of the alkyl radicals, cycloalkyl radicals, alkenyl radicals, mononuclear radicals and fluoroalkyl radicals previously identified for the organopolysiloxane plasticizer fluid in the catalyst component composition.

Along with the 100 parts of the silanol end-stopped polymer, there may be utilized anywhere from 0 to 300 parts of a filler and more preferably, from 10 to 200 parts of a filler which can be any of the reinforcing fillers identified previously. Most preferaly the filler is an extending filler when the composition is utilized to produce insulating glass composition since the extending filler, such as calcium carbonate and carbon black, will give the composition the proper viscosity and make the total composition thixotropic as well as give it appropriate strength properties without making the composition expensive.

In addition to the filler ingredient, there may be added other ingredients to the base component such as flame retardant additives, plasticizing additives, and so forth.

It should be noted that other components may be added to the catalyst component identified previously as long as they do not interfere with the shelf stablity properties of the catalyst component composition. Ingredients which might be added are flame retardant additives, swell resistant additives, heat agent additives, and so forth.

Per 100 parts by weight of the silanol end-stopped diorganopolysiloxane polymer in the base component there may be utilized anywhere from 1 to 30 parts by weight of the catalyst component of the instant invention. More specifically, per 100 parts by weight of the base component that is the silanol polymer and a filler, there may be utilized from anywhere from 1 to 15 parts of the catalyst component and more preferably from 5 to 10 parts by weight of the catalyst component.

It has been found that the preferred mixing ratios give the best type of thixotropic, insulating sealant composition and are mixed most efficiently by the mixing apparatus currently on the market. Upon being mixed, the composition will develop a tack free surface in 20 to 40 minutes and will cure to a silicone elastomer with total cure occurring in 24 to 72 hours.

It should be further noted that it was not intended to limit the composition to specific concentrations of ingredients. The only specific or critical part of the instant invention is in the preparation of the catalyst component, that is, the disclosure of the pre-mixing from 1 to 15 percent by weight of the total amount of the cross-linking agent, the self-bonding additive and the tin salt with the organopolysiloxane plasticizer fluid and then the addition of the total amount of the filler and then after the composition has been thoroughly mixed and dried under vacuum so as to drive off all water then and only then is the rest of the three ingredients or other additional ingredients added to the catalyst component.

A secondary improvement of the present invention is to use a linear organopolysiloxane fluid of a viscosity varying from 10,000 to 50,000 centipoise rather than a lower viscosity fluid in the case of the catalyst component to produce a catalyst component having a viscosity varying from 30,000 to 250,000 centipoise at 25° C.

If a lower viscosity plasticizer fluid is utilized, the desired end viscosity of the composition is not obtained as easily even with the incorporation of additional filler. In addition, the composition does not stabilize as effectively at the preferred viscosity range as is the case when the plasticizer fluid has a viscosity varying from 10,000 to 50,000 centipoise. The examples below given for the purpose of illustrating the present invention. They are not given for the purpose of setting limits and boundaries to the present invention. All parts in the examples are by weight.

EXAMPLE 1

There was prepared in a Change Can Mixer a Component B comprising 37.4 parts of a 28,000 centipoise vinyl end-stopped dimethylsiloxane to which was added 20.06 parts of calcium carbonate. When the calcium carbonate was wet-in there was added 18.7 parts of carbon black in 3 additions. After the last addition was wet-in the batch was mixed 20 minutes and the mixer was opened and the blades and sides of the change can were scraped down. The mixer was then sealed and the batch was dried to remove water for 3 hours at 125° C. at 20 mm vacuum. The batch was cooled at 32° C. and 7.55 parts of condensed ethyl silicate, 15.1 parts of gamma aminopropyltriethoxysilane, and 1.05 parts of dibutyltin oxide were added in three additions to the mixer. A slight $N_2$ purge was in the mixer to exclude moisture from this stage to the final packaging. The batch was mixed 30 minutes and the mixer stopped to scrape down blades and sides of mixer. The mixer was sealed and mixed 30 minutes under 20 mm. vacuum and the batch was packaged into drums which were immediately sealed. The mixer blades and sides of mixer were coated with thick thixotropic mixture which had to be removed by several solvent clean outs plus scraping before proceeding with the next batch. The clean out procedure following each subsequent batch required approximately 24 hours. Note that 5-15 percent of the batch was lost in the so called hang up of the mixture that was coated on the blades and sides of the Change Can Mixer.

Batches prepared by this mixing method resulted in lumps, crystals, agglomerates and oil separation. The paste catalyst mixture when mixed with a base at 1 part catalyst per 10 parts of base to prepare insulating glass window units in metering or dispensing equipment resulted in frequent stoppage of the metering equipment because of the agglomerates, crystals, lumps clogged the screens. Many batches prepared by this method were rejected by customers preparing insulating glass units.

EXAMPLE 2

There were weighed the following individual ingredients, 112 parts by weight of 28,000 centipoise at 25° of a dimethylsiloxane vinyl chain-stop polysiloxane fluid, 44 parts of carbon black, 61 parts of calcium carbonate, 5.2 parts of gamma aminopropyl triethoxysilane, 22.6 parts of condensed ethyl orthosilicate and 3.14 parts of dibutyltin oxide. The above catalyst component was prepared on a Baker-Perkins Change Can Mixer. The calcium carbonate and carbon black were added until wetted into the polymer. The mixture was then dried at 120° C. under 6 mm of vacuum for 2 hours. The mixture was then cooled below 30° C. and all the pre-blend of ethyl silicate gamma aminopropyltriethoxysilane and the tin salt was added slowly while mixing. The mixture was mixed for 30 minutes plus an additional 20 minutes under vacuum to remove air. This mixture was the control.

There was then prepared and utilized with the same weights of the same ingredients, a second mixture, Mixture B. Ten percent by weight of the total weight of the gamma aminopropyl triethoxysilane, ethyl silicate and tin salt was pre-blended and was added to the mixture with all of the vinyl stopped polymer. All of the calcium carbonate and carbon black were added to wet in and then the mixture was dried for 2 hours at 120° C. under 6 mm of vacuum. The base mixture was then cooled below 30° C. and the remaining 90 percent of the total gamma aminopropyl triethoxysilane, ethyl silicate and tin salt, pre-blend was added slowly. The mixture was mixed 30 minutes plus an additional 20 minutes under vacuum.

There was then prepared a Mixture C utilizing the same ingredients and the same total amount of the ingredients. Mixture C was prepared as follows: 10 percent by weight gamma aminopropyl triethoxysilane, ethyl silicate and tin salt pre-blend was added to the mixture with all of the polydimethylsiloxane vinyl chain-stopped polymer. Then all of the carbon black and calcium carbonate was added until they were wetted into the mixture and the mixture was dried for 2 hours at 120° C. under 6 mm. vacuum. Then the mixture was cooled below 30° C. and the remaining 90 percent of the total gamma aminopropyl triethoxysilane, ethyl silicate and tin salt pre-blend was added slowly. After it was all added, the mixture was mixed 30 minutes plus an additional 20 minutes under vacuum. The resulting compositions that is the Control Mixtures B & C were accelerated aged for 2 months at 50° C. in a half pint can. The oil separation in the half pint can of 200 grams of sample after the accelerated aging in the case of the Control was 5 ccs of fluid oil on top of the half pint can. There was no oil separation in Composition B and in Composition C. Initial viscosity of the Control was 350,000 centipoise. The initial viscosity of Mixture B was 100,000 centipoise at 25° C. and initial viscosity of Mixture C was 95,500 centipoise at 25° C.

Further, neither the samples of Mixture B or C that were accelerated aged formed any nodules in the composition or decreased in the viscosity by more than 3,000 centipoise. On the other hand, Composition A formed nodules upon standing and markedly decreased in viscosity as much as 50,000.

We claim:

1. A room temperature vulcanizable silicone rubber composition that has a mixed viscosity of from 100,000 to 1,000,000 centipoise at 25° C. and that does not separate out and does not have any nodules comprising (A) 100 parts by weight of a silanol-end stopped diorganopolysiloxane having a viscosity varying from 1,000 to 1,000,000 centipoise at 25° C. where the organo groups are monovalent hydrocarbon radicals; and (B) from 0 to 300 parts of a filler; and (C) from 1 to 30 parts by weight of a catalyst component provided by:

(a) mixing 100 parts by weight of an organo polysiloxane fluid of a viscosity varying from 1,000 to 50,000 centipoise where the organo group is a monovalent hydrocarbon group, with a first portion of a mixture of crosslinking agent, catalytic promoter and self-bonding additive effective for providing a stable catalyzed paste base mixture of said composition upon heat cycling of said base mixture wherein said first portion constitutes 1 to 15 percent by weight of the total amount of crosslinking agent, catalytic promoter and self-bonding agent utilized in said shelf-stable catalyst component for a room temperature vulcanizable silicone rubber composition and is comprised of:

(1) an alkyl silicate crosslinker of the formula:

or partial hydrolysis producers thereof wherein R and $R_1$ are monovalent hydrocarbon radicals, m is 0 or 1;

(2) a tin salt catalytic promoter and
(3) a self-bonding additive of the formula:

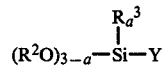

where $R^2$ and $R^3$ are alkyl radicals of 1 to 8 carbon atoms, a is 0 or 1 and Y is a nitrogen-functional radical which is a saturated, unsaturated or aromatic residue which in addition to nitrogen functionality may be functionalized by a radical selected from the class consisting of amino, cyano, thio, oxo, and ester, and multiples and combinations thereof; and after there is a uniform mixture of (a);

(b) adding to the mixture from 10 to 250 parts of filler and mixing the ingredients to a uniform mixture and heating the mixture to a temperature of at least 100° C. for at least 1 hour thereby providing a stable paste-like base mixture; and (c) mixing into the base mixture a second portion consisting of the remainder of the cross-linking agent, the catalytic promoter and self-bonding additive; and mixing to a uniform fluid mixture by agitating the base mixture and the rest of the ingredients for at least 30 minutes wherein the entire process is carried out in the substantial absence of moisture.

2. The composition of claim 1 wherein the filler is selected from the class consisting of fumed silica, precipitated silica and extending fillers.

3. The composition of claim 2 wherein the silanol end-stopped diorganopolysiloxane has the formula,

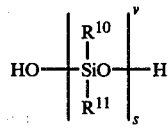

where $R^{10}, R^{11}$ are independently selected from monovalent hydrocarbon radicals and s varies such that the viscosity of the polymer varies from 1,000 to 1,000,000 centipoise at 25° C.

* * * * *